(12) United States Patent
Reynolds (10) Patent No.: US 6,662,483 B2
(45) Date of Patent: Dec. 16, 2003

(54) POINT-OF-PURCHASE ADVERTISING BY A CANTILEVERED DISPLAY MECHANISM WITH AN UNDER-THE-SHELF BATTERY AND RELATED METHODS

(76) Inventor: Randy B. Reynolds, 2194 E. Country View La., Salt Lake City, UT (US) 84121

(*) Notice: Subject to any disclaimer, the term of this patent is extended or adjusted under 35 U.S.C. 154(b) by 88 days.

(21) Appl. No.: 10/024,082

(22) Filed: Dec. 17, 2001

(65) Prior Publication Data

US 2002/0059743 A1 May 23, 2002

Related U.S. Application Data

(63) Continuation-in-part of application No. 09/969,397, filed on Oct. 1, 2001, which is a continuation of application No. 09/656,899, filed on Sep. 9, 2000, now abandoned, which is a continuation of application No. 09/239,918, filed on Jan. 28, 1999, now Pat. No. 6,202,334.

(51) Int. Cl.[7] .................................................. G09F 3/18
(52) U.S. Cl. .................................. 40/642.02; 40/661.03
(58) Field of Search ........................... 40/661.02, 661.03, 40/606.14, 606.15, 642.02

(56) References Cited

U.S. PATENT DOCUMENTS 4,924,363 A * 5/1990 Kornelson
5,111,606 A * 5/1992 Reynolds
5,899,011 A * 5/1999 Brinkman ................. 40/661.03

* cited by examiner

Primary Examiner—Joanne Silbermann
(74) Attorney, Agent, or Firm—Lynn G. Foster (57) ABSTRACT

A novel point-of-purchase cantilevered deflectable display assembly which normally extends transversely into a shopping aisle, is disclosed. The disclosed display assembly accommodates substitution of one frame-carried form or configuration of advertising for another, which can be radically different, without disconnecting the entire display assembly from its mounting to a molding at a store shelf or like. The advertising frame with which the advertising medium is associated is removably connected to a distal hanger member. At least one light is carried by the frame. The distal hanger member accommodates the above-mentioned on-site frame and advertisement removal and exchange, while the remainder of the display assembly remains in its shelf-mounted or like position. The display assembly disclosed enhances the deflectable nature of the cantilevered distal part of the display assemblies, the manner in which pivoting occurs and is controlled or limited and the way in which the display assemblies are biased toward neutral in the assembled condition. The electrical power supply is concealed in a housing beneath the store shelf for illuminating the light carried by the frame and the assembly is clamped to the shelf edge molding from the front and back of the molding. An elongated source of illumination is also disclosed.

8 Claims, 8 Drawing Sheets

POINT-OF-PURCHASE ADVERTISING BY A CANTILEVERED DISPLAY MECHANISM WITH AN UNDER-THE-SHELF BATTERY AND RELATED METHODS

CONTINUITY

This application is a continuation-in-part of copending U.S. patent application Ser. No. 09/969,397, filed Oct. 1, 2001, which is a continuation of U.S. patent application Ser. No. 09/656,899, filed Sep. 9, 2000 now abandoned, which is a continuation of U.S. patent application Ser. No. 09/239,918, filed Jan. 2, 1999 now U.S Pat. No. 6,202,334.

FIELD OF THE INVENTION

The present invention relates generally to point-of-purchase product advertising and more particularly to such advertising using novel deflectable cantilevered lighted display mechanisms comprising an under-the-shelf battery which extend generally transversely into a shopping aisle in a grocery store, a supermarket, a discount center or the like. Novel elongated sources of illumination are also within the field of this invention.

BACKGROUND

Point-of-purchase advertising in grocery stores and similar businesses has existed for a very long time. A number of advertising techniques have been employed with the goal of enhancing the sales volume of advertised products. Some of the advertising techniques of the past, which target a specific product, have had little impact on sales, while others have caused a measurable increase in sales. Most sales increases in the past have been modest. Thus, the quest has continued for better ways to enhance sales of a given product, among many other available products, offered along a shopping aisle in a retail store.

Typically, the manufacturer of a product, which is to receive target point-of-purchase advertising in a retail store, places or contracts for the placement of the advertising directly adjacent to the product, stored on a shelf, in a refrigerated cabinet or on a rack. The costs of such advertising must be balanced against the increase in sales of the product, if any, which is the subject of the target advertising. Key factors in respect to such point-of-purchase advertising are: (1) the extent to which the attention of prospective customers is attracted directly and meaningfully to the product receiving the target advertising over and above other available products; (2) the comparative cost of the advertised product; and (3) the cost and convenience of installing, maintaining and varying the target advertising. As stated above, most prior art point-of-purchase display devices have not produced a large increase in sales.

Until recently, prior art point-of-purchase advertising displays have sometimes comprised rigid and static displays supported by a shelf such that the advertising thereof faces the aisle while typically being generally flush with the shelf. Such signs are known to sometimes provide illumination, but such illumination is obscure because it is directed transversely into the aisle from difficult to observe locations between shelves which contains goods in the form of stacked cans or packages, for example. One must be in the aisle directly in front of the display in order to effectively see the illumination. Also, the advertising indicia of the sign is parallel to the aisle, requiring the potential purchaser to be directly in front of the sign in order to read and understand the advertising indicia. See U.S. Pat. Nos. 3,015,177 and 4,924,363 for examples.

As an alternative, the earlier prior art teaches use of a non-illuminating deflectable display assembly which is mounted in cantilevered fashion to extend transversely into a shopping aisle. See U.S. Pat. No. 4,805,331. A top eccentric torsion spring biases the display assembly toward the neutral position counter to any displacement by a shopping cart, for example. This type of sign does not adequately attract the singular attention of potential buyers.

In addition, it is known to provide an illuminated deflectable display mechanism which comprises a permanent cantilevered frame indirectly mounted to shelf molding in which one or more advertising cards are inserted. See U.S. Pat. No. 5,233,773. While the advertising cards are removable and replaceable, the overall configuration and nature of the advertising region is fixed. It is, therefore, impossible to vary the peripheral limits and the basic nature of advertising, though card content may vary. A deflection-accommodating spring or other return is connected directly to the proximal part of the frame or, in the alternative, an eccentric elevated torsion spring returns the frame, after lateral deflection, to its neutral position. If a peripherally different sign is desired, the entire display assembly must be removed and replaced by something else, if available.

Prior art point-of-purchase display assemblies fail to accommodate substantial variation in the nature, the configuration, including the peripheral make-up, and the content of the advertising segment of a display assembly without requiring disconnection and removal of the entire display assembly from its mounting upon a molding at a shelf edge or on the face of a refrigerator cabinet.

Also, the nature of a centrally-disposed return spring for cantilevered display assemblies of the prior art typically requires attachment of the return spring directly to the proximal end of the frame, which frame surrounds the area of advertising. Thus, the central return spring not only biases the display assembly toward neutral, but also fully supports the weight of the cantilevered frame and the contents thereof while singularly absorbing the deflection impact of shopping carts against the frame. As a consequence, the life of the return spring is relatively short and as the spring begins to lose its resiliency or strength, the display frame may not continue to return to neutral and/or may sag.

Furthermore, provision of illumination systems for such display assemblies has posed certain problems related to size, life expectancy, location and access to and vandalism of sources of power comprised of batteries.

In addition, insertion, retention and removal of the peripheral frame with one or more advertising cards therein has presented difficulties.

BRIEF SUMMARY AND OBJECTS OF THE PRESENT INVENTION

In view of the foregoing, the present invention overcomes or substantially alleviates problems of the prior art. The present invention embodies improvements in point-of-purchase cantilevered deflectable display assemblies with illumination, which gain the singular attention of consumers thereby significantly enhancing sales of the products, are the subject of the target advertising and allow temporary deflections out of the orthogonal or neutral position due to an external force.

Display assemblies embodying the present invention are convenient to install and maintain and, further, accommodate facile on-site change in the nature and configuration of the advertising from time-to-time. An under-the-shelf battery supply for illumination of at least one source of illumination greatly enhances the value of the invention.

In brief summary, the present invention accommodates substitution of one frame-carried form or configuration of advertising for another, which can be radically different, without disconnecting the entire display assembly from its mounting to a molding strip at a store shelf or like. The advertising frame with which the advertising medium is associated is removably connected to a hanger member. The hanger member accommodates on-site frame and advertisement removal while the remainder of the display assembly remains in its shelf-mounted or like position. An entirely different advertising frame and associated advertisement may be substituted by connecting a different advertising frame or the like to the hanger portion. The value of the invention is materially increased by an under-the-shelf battery supply by which one or more lights on any of the advertising frames are illuminated.

The present invention also comprises novel display assemblies which enhance the deflectable nature of the cantilevered distal part of the display assemblies, the manner in which pivoting occurs, the control available and the way in which the display assemblies are biased toward neutral in the assembled condition.

In a preferred form of the invention, a proximal molding clamp is affixed to one of two hanger members. One hanger member may be adjustable in respect to the molding clamp to accommodate adjustment in the angle of presentation, such as leveling of the display assembly. One of two clamping or mounting members, at its distal part, pivotably interfaces uniquely with the one hanger member, with the second hanger member releasibly or removably attaching to a distal frame portion which holds the advertising. At least part of the cantilevered weight and each impact load imposed by a shopping cart or a shopper are transferred across the hanger members and the clamping or mounting members to the molding strip. Thus, the weight and external loads imposed upon a return mechanism are greatly reduced, thereby enhancing the life of the return mechanism. By placing the return mechanism centrally between the two hanger members, the clamping or mounting members and hanger members are caused to compressively though pivotably engage each other, and the distal hanger member and the frame are collectively placed in a neutral position cantilevering transversely though deflectably into a shopping aisle.

The interface between the proximal and the distal hanger members may comprise multiple spaced pivot sites to accommodate various forms of deflection. One way this is accomplished is by use of rounded male projections and matching female recesses at the interface may define a plurality of spaced pivot axes, to accommodate movement up, down, laterally in one direction and laterally in the other direction, responsive to external forces.

The present invention preferably comprises a novel return mechanism comprising at least two concentric coil springs, which preferably are oppositely wound. A stabilizing strap may be disposed along the center of the internal coil spring. The return mechanism spans between distal and proximal hanger members. The return mechanism is concealed internally when the display assembly is in its neutral cantilevered position extending transversely into a shopping aisle and does not fully support the weight of the pivotal part of the display mechanism. The return mechanism is more effective, has a longer life and, in a given embodiment, readily accommodates (a) up, down and lateral displacement or deflection caused by external forces, such as impact or collision by a shopping cart, and (b) return to the neutral position when the external force is removed.

In one form of the invention, a unique illumination system is provided, including a novel under-the-shelf and behind-the-molding power supply, which reduces the likelihood of vandalism. The present invention may embrace: a flexible aisle display comprised of a self-contained on-site independent electrical power source, circuitry and at least one light; a display mechanism comprised of forward and rear viewing areas providing unobstructed views along the aisle in either direction; and a bi-directional viewable display assembly which does not materially interfere with shelf access and which so singularly captures the focus of shoppers that all shelves where the display is used become primary locations and sales markedly increase.

Given the foregoing, it is a primary object of the present invention to overcome or substantially alleviate problems of the prior art in the field of point-of-purchase advertising display devices.

It is another primary object to provide point-of-purchase cantilevered deflectable display assemblies, and related methods, which singularly gain the attention of consumers to significantly enhance sales of products so advertised.

It is a significant object to provide a cantilevered display assembly comprising an under-the-shelf battery supply and related methods.

Another object of significance is the provision of a shelf mount battery housing for securing a cantilevered display assembly to the shelf and to receive an under-the-shelf battery supply and related methods.

A further object is provision of a cantilevered display assembly which clamps to a molding strip of shelf from both sides of the strip and related methods.

It is also an important object to provide novel point-of-purchase cantilevered deflectable display assemblies, and related methods, where the display assemblies are convenient to install and maintain and, further, accommodate facile on-site change in the nature and configuration of advertising from time-to-time.

It is a further valuable object to provide a novel cantilevered advertising display assembly, and related methods, which accommodate on-site substitution of one frame-carried form or configuration of advertising for another while the remainder of the assembly remains mounted to a store shelf or like molding along a shopping aisle in a store.

Another paramount object is the provision of a display assembly, and related methods, the assembly comprising a frame which carries an advertising medium and is removably and replaceably connected to a frame hanger member, whereby the frame and advertisement carried by the frame may be disconnected and removed from the hanger member and replaced by a second frame and advertising segment which is connected to the hanger, while the remainder of the display assembly remains in its shelf-mounted or like position. The second frame and advertising segment may be similar or entirely dissimilar when compared to the first.

Another important object of the present invention is to provide a novel cantilevered display mechanism which uniquely enhances the deflectable or pivotable nature of the cantilevered distal part of the display assembly.

An additional dominant object is the provision of a cantilevered display assembly, and related methods, wherein the manner in which the displacement of the distal part thereof is controlled or limited and the way in which the display assembly is biased toward a neutral position are novelly achieved.

It is also a significant object to provide a novel cantilevered display assembly comprising structure by which the angle of presentation is adjusted, including but not limited to leveling of the display assembly.

A further primary object is the provision of a novel deflectable cantilevered display assembly, and related methods, the assembly being comprised of a mounting member which interfaces at a distal part with a hanger member which in turn releasibly attaches to a frame portion, whereby at least some of the weight of the assembly and each impact load, imposed by a shopping cart or something else, are transferred across the hanger, the base and a clamp to a store molding.

Another object of value is the provision of a deflectable cantilevered display assembly comprised of a novel support system and return mechanism by which weight and impact loads are distributed, thereby enhancing the expected life of the return mechanism.

It is a further significant object to provide a deflectable cantilevered display assembly comprising a novel return mechanism centrally disposed between two hanger members so as to cause the two hanger members to compressively engage each other whereby a distal advertising part is biased into a neutral position, cantilevering transversely into a shopping aisle.

An additional paramount object is the provision of a point-of-purchase pivotable display assembly comprising a novel interface between two hanger members, which is comprised of multiple, spaced pivot sites.

A further valuable object is the provision of a deflectable cantilevered display assembly comprising a novel interface relationship between a proximal part and a distal part, which are pivotably engaged so as to define multiple, spaced pivot axes accommodating up, down and two-way lateral displacement responsive to external forces.

Another object of importance is the provision of a cantilevered pivotable display assembly comprising a novel return mechanism comprised of two concentric coil springs.

Another object of value is the provision of a cantilevered pivotable display assembly comprising a novel concentric coil spring mechanism comprised of oppositely wound coil springs.

Another object of significance is the provision of a cantilevered pivotable display assembly comprising a novel return mechanism comprised of two concentric coil springs and a stabilizing strap in the hollow center of the interior coil spring.

A further dominant object is the provision of a deflectable cantilevered display assembly comprising a novel longer life return mechanism concealed when the assembly is in a neutral cantilevered position extending transversely into a shopping aisle whereby the return mechanism does not fully support the weight of the assembly and yet accommodates up, down and lateral displacement caused by external forces, such as impact by a shopping cart.

An object of value is the provision of a deflectable cantilevered point-of-purchase display assembly comprising a novel under-the-shelf to display electrical power and frame-carried illumination system.

An additional paramount object is the provision of a display mechanism comprising a novel under-the-shelf compartment for facile insertion and removal of batteries, which reduces likelihood of tampering and vandalism.

Another important object is the provision of display assemblies of the type identified above which comprise one or more novel elongated sources of illumination.

These and other objects and features of the present invention will be apparent from the detailed description taken with reference to the accompanying drawings.

DETAILED DESCRIPTION OF THE ILLUSTRATED EMBODIMENT

Reference is now made to the drawings, wherein like numerals are used to designate like parts throughout. The drawings are illustrative of cantilevered deflectable illuminated display assemblies or mechanisms which extend orthogonally into a shopping aisle from a shelf in a grocery store, a supermarket, a discount center or the like to enhance sales volume of the advertised products. Display assemblies in accordance with the present invention are constructed so as to obtain the singular attention of shoppers in such a way that the product which is the target of the advertising is clearly recognized by the shoppers to precipitate a substantial enlargement of sales of a product than would otherwise occur. They also accommodate facile exchange of advertising while the assembly is mounted to a store molding. They allow temporary deflections out of the orthogonal or neutral position due to an external force. The electrical power supply, for illumination of one or more sources of illumination on the display, is located beneath the shelf.

Figure 1:
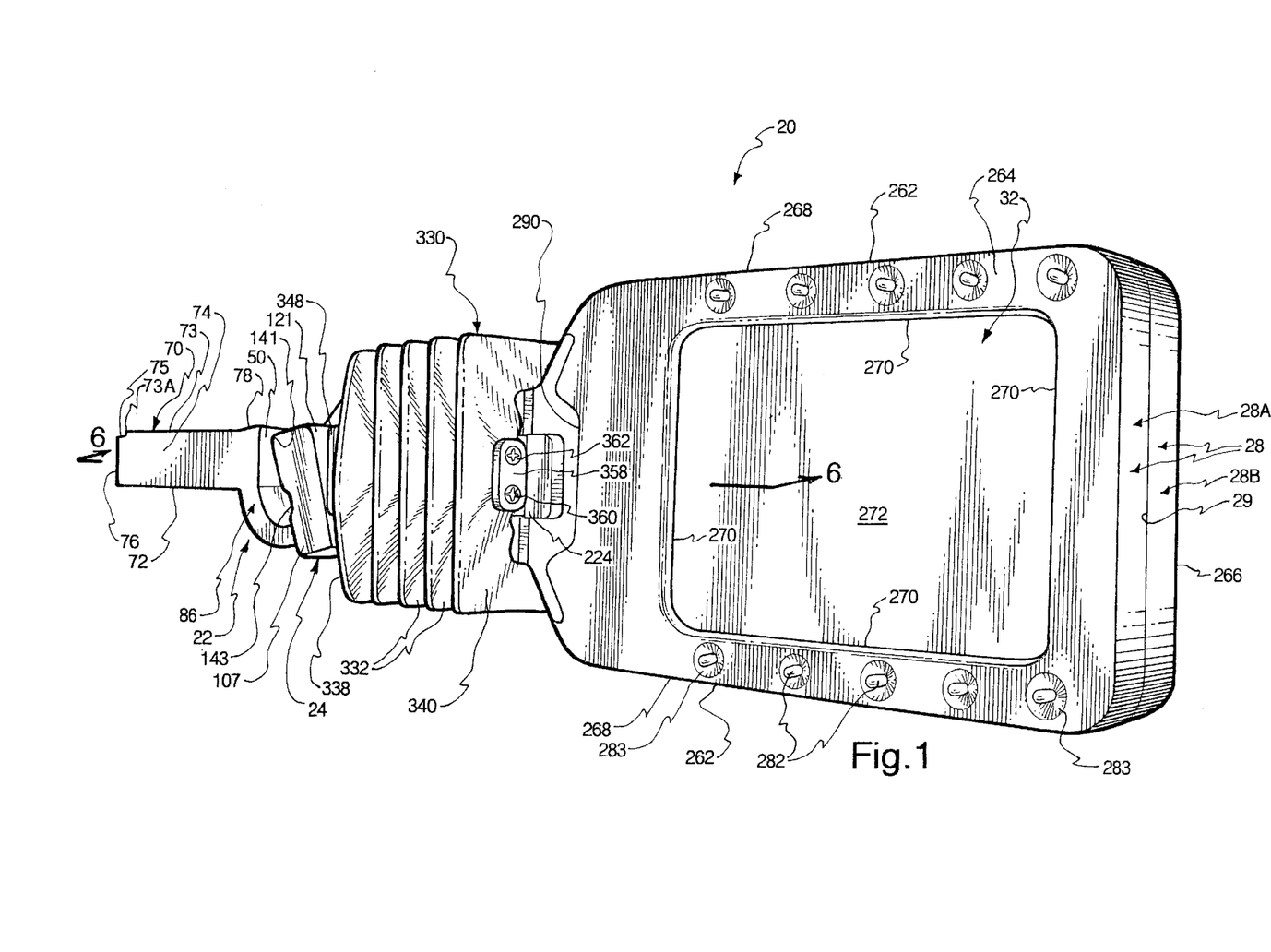
FIG. 1 is a perspective of one display assembly configuration embodying the present invention.

With reference to FIG. 1, a cantilevered, deflectable display assembly, generally designated 20, is illustrated. Assembly 20 is comprised of two proximal mounting members, generally designated 22 and 24. Mounting member 24 provides an adjustment feature accommodating control of the angle of presentation of the display assembly (such as in a horizontally-disposed orientation). The proximal clamp member 22 and the base member 24 do not rotate or deflect when the distal region of the display assembly 20 is impacted by or receives an external force from a shopper, shopping cart or in some other way.

The display assembly 20 further comprises a hanger segment, generally designated 26 and comprised of two hanger members 26A and 26B, and a frame segment, generally designated 28. The frame segment 28 carries advertising and extends peripheral around a display region, which comprises a bi-directional advertising area, generally designated 32, comprised of oppositely directed viewing transparent windows 272 and 274, one on each side so that shoppers moving along the aisle in either direction have an unobstructed view along the shopping aisle of the advertising placed behind each window 272 and 274.

Figure 3:
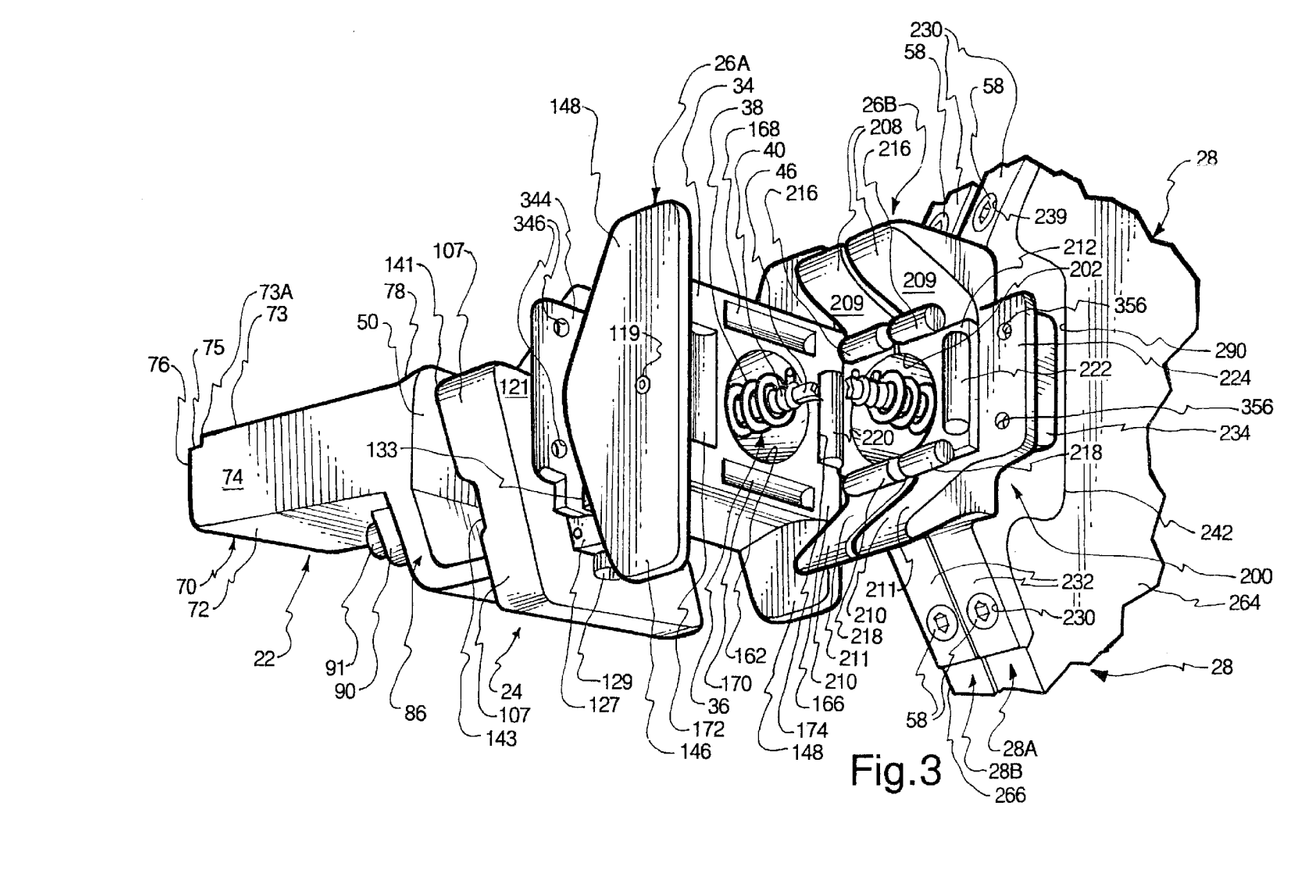
FIG. 3 is an enlarged fragmentary perspective illustrating the distal part pivoted laterally in one direction in respect to a proximal part of a hinge mechanism as well as a return mechanism.
Figure 6:
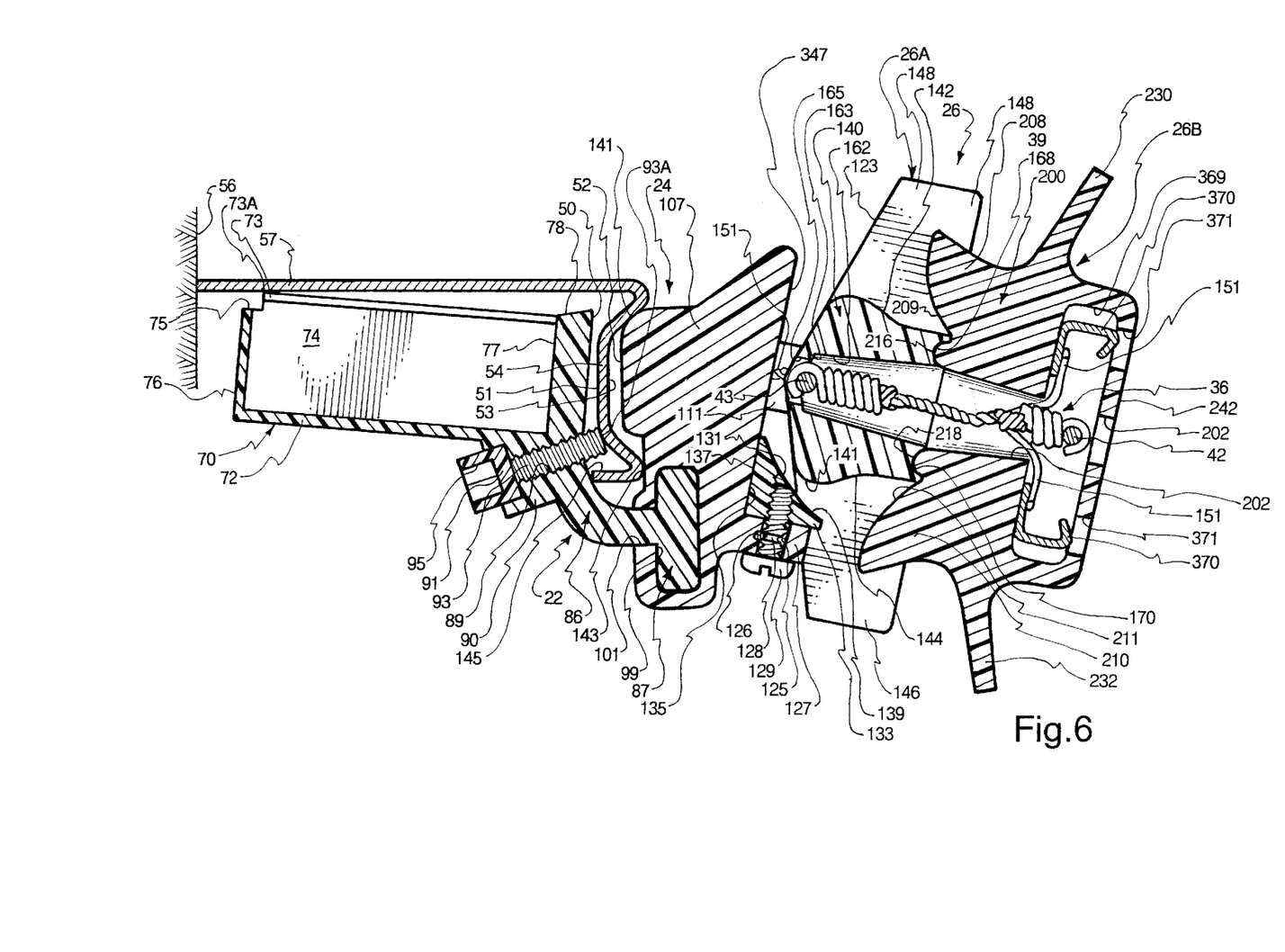
FIG. 6 is a vertical cross section through the proximal portion of the display assembly of FIG. 1.

Hanger member 26A is connected distally to mounting member 24 by pivot pins or tubes 119. A surface 34 of hanger member 26A exists at the interface between the hanger part 26A and the hanger part 26B (FIG. 3), which accommodates pivoting of the hanger element 26B and the peripheral frame 28 in respect to the hanger element 26A as explained below in greater detail. The interface surface 34, therefore, does not per se provide a direct connection between the hanger element 26A and the hanger element 26B, but rather the interface 34 is constantly under compression by force of a return mechanism, generally designated 36 (FIGS. 3 and 6). The hanger element 26B and the peripheral frame 28 yield or deflect in the direction of impact by a shopping cart, for example, somewhat counter to the compression asserted by the return mechanism 36. The return mechanism 36, therefore, restores the hanger element 26B and the frame 28 to their normal perpendicular condition extending into the aisle when the force imposed by external shopping cart is removed.

Note, from FIG. 3, that the return mechanism 36 is illustrated as being comprised of two concentric though oppositely wound coil springs 38 and 40, each connected at a hook end to a rod 42 at one end and a cross bar or rod 44 at the other end so as to be in tension to thereby place the hanger elements 26A and 26B in compression at interface 34. A stabilizing strap 46 is illustrated as passing through the hollow center of the inside coil spring 40 and likewise connects to rod 42 and cross bar 44 at opposite end loops of the strap 46. The return mechanism 36 is est illustrated in FIGS. 3 and 7. Thus, the return mechanism 36 does not attach directly to the frame 28 nor to the mounting member 24 and the full weight of the pivotable portions 26B and 28 is not carried exclusively by the return mechanism 36 but rather is transferred in part across interface 34 and thence across the hanger element 26A to the clamping member 24. Because of the manner of load and weight transfer, the useful life of the return mechanism 36 is very long.

The clamping or mounting members 22 and 24 are collectively comprised of upwardly directed surfaces 50 and 52, which are respectively juxtaposed to rear and front surfaces 51 and 53 of a molding edge strip 54 comprising a front depending portion of a shelf 57 by which the display assembly 20 is supported by the molding 54. The molding or channel 54 maybe formed of a suitable metal and is anchored at abutment 56. Abutment 56 may comprise the end of a shelf or the face of a refrigerator cabinet or some other location along a shopping aisle of a grocery or other retail store.

It is an important feature of the illustrated embodiment to provide a display assembly or mechanism for point-of-purchase utilization along a shopping aisle such that the advertising presented by the display assembly can be materially altered in its nature, configuration, peripheral makeup and content from time to time, as desired by the manufacturer of products subject to the advertising and/or by store management.

In respect to display assembly 20, the hanger member 26B releasibly or removably attaches to the peripheral frame 28 using, in the illustrated embodiment, four countersunk screws 58. See FIG. 3. Accordingly, with the display assembly 20 securely mounted to the store molding 54 between the surfaces 50 and 52, removal of fasteners 58 will disconnect the peripheral frame 28 from the hanger element 26B for unitary removal and replacement of the frame 28. See FIGS. 2 and 3. Thereafter, a similar, or, if desired, a substantially different advertising display end for the display assembly 20 may be connected to the hanger member 26B. Thus, display assemblies of the present invention accommodate substantial on-site variation in the nature, the configuration, including the peripheral make-up, and the content of the advertising segment of a display assembly, without requiring disconnection and removal of the entire display assembly from its mounting upon the molding at a shelf edge 54 or from some other location. Virtually any advertising configuration can be removed from or connected to the hanger member 26B to provide essentially an infinite number of on-site possibilities, none of which require that the entire display assembly 20 be disconnected from its mounting to the store-provided molding 54. Thus, the hanger element 26B accommodates facile on-site frame and advertisement removal and exchange, while the remainder of the display assembly remains in its shelf-mounted or like position in the store.

The proximal mounting member 22 is illustrated as essentially comprising a one piece element formed by injection or other conventional molding techniques using a suitable rigid, non-frangible, impact resistant synthetic resinous material. The back end of the proximal mounting member 22 comprises a box-shaped frame 70 defined by a bottom wall 72, spaced and substantially identical, though opposite hand, sidewalls 74, a backwall 76 and a front reinforced wall 78. Walls 72, 74 and 76 are illustrated as being planar and of essentially uniform thickness. Front wall 78 is illustrated as comprising a smooth exterior surface 79, with vertically directed, spaced, weight-saving reinforcing ribs 77 at the interior surface of front wall 78. Wall 76 comprises a top edge 75, which is located below the top inwardly directed lips 73 of walls 74. The edge 75 and lips 73 accommodate insertion of a top plate 71 (FIG. 4) linearly across the edge surface 75 and below the lip 73 to essentially close the open top of the box-shaped receptacle 70.

Prior to assembling the top plate 71, batteries 80 are placed in each battery compartment 82 (four battery compartments 82 being illustrated) of a battery pack or receptacle 81 and the battery receptacle 81 placed in the hollow cavity 83 of the box-shaped receptacle 70. Conductors 84 are electrically-connected to the batteries 80, which are connected to each other in series. Conductors 84 extend through the material comprising housing 22 and are respectively connected to spring contacts 85.

A yoke 86 depends as one piece in a downward and forward direction from the box-shaped housing 70 and is integral, as one piece, with an extended rectangularly-shaped slider bar, generally designated 87. The contacts 85 are carried in a secured manner by the slider bar 87 using a suitable adhesive or some other type of agent or fastener. The space between slider bar 87 and surface 50 accommodates mounting of the assembly 20 to the molding strip 50. See FIG. 6.

The yoke 86 has spaced, weight-saving reinforcing ribs 88 at the back thereof as well as an upwardly-directed threaded bore 89 (FIG. 6). An external boss 90 surrounds the rear portion of the threaded bore 89. A large screw 91 is threaded at shaft 93 thereof into the bore 89. Screw 91 also comprises an allen head receptacle 95 by which the screw 91 is advanced and retracted in threaded bore 89. When advanced, as best shown in FIG. 6, the leading blunt edge 93A of the fastener 91 tightly engages the molding strip 54 to secure the display 20 to the edge 54 and the shelf 57 in deflectable cantilevered relation so that inadvertent removal does not occur. As illustrated in FIG. 6, the trailing corners 73A of the lips 73 of spaced sidewalls 74 contiguously engages the lower surface of the shelf 57, when the assembly 20 is secured to the molding strip 54. It is to be noted in FIG. 6 that the lid 71, the batteries 80 and the battery pack 81 are removed for clarity of illustration.

The slider bar 87 is, with the exception of contacts 85 and a small slot 97 (FIG. 2), comprised of a solid rectangular shape, sized to accommodate sliding insertion and removal into and from a rectangular recess 99 (FIG. 6) of mounting member 24. In this way, the proximal mounting members 22 and 24 may be readily assembled and disassembled, as desired, without tools.

As best seen in FIG. 6, the recess 99 defines a horizontal slot 101 through which the yoke 86 extends when the slider bar 87 is in the recess 99, as best illustrated in FIG. 6.

Figure 4:
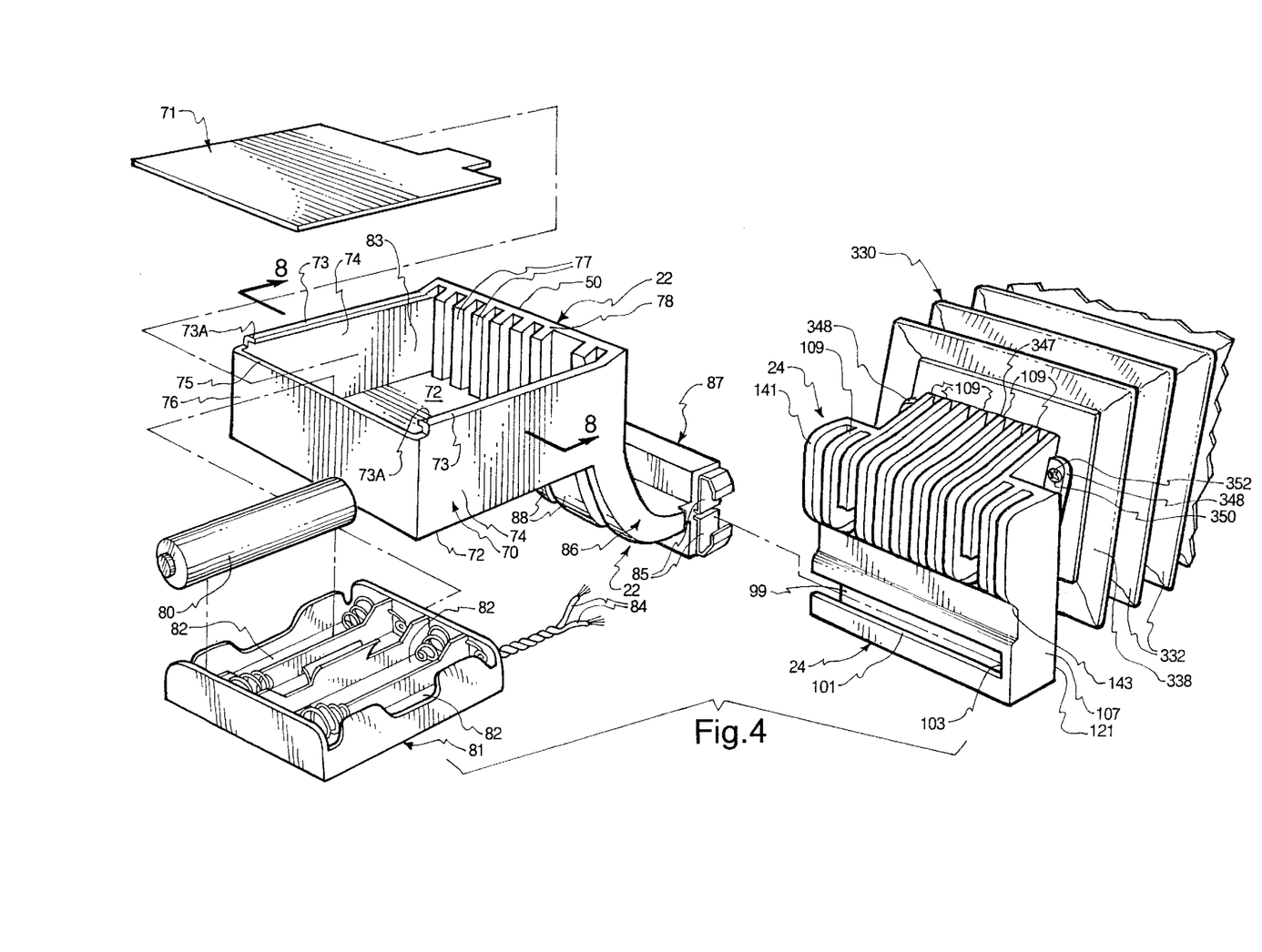
FIG. 4 is an exploded perspective of the proximal end of side elevation of the display assembly of FIG. 1, showing the back side of the hinge mechanism and the under-the-shelf-battery housing.
Figure 5:
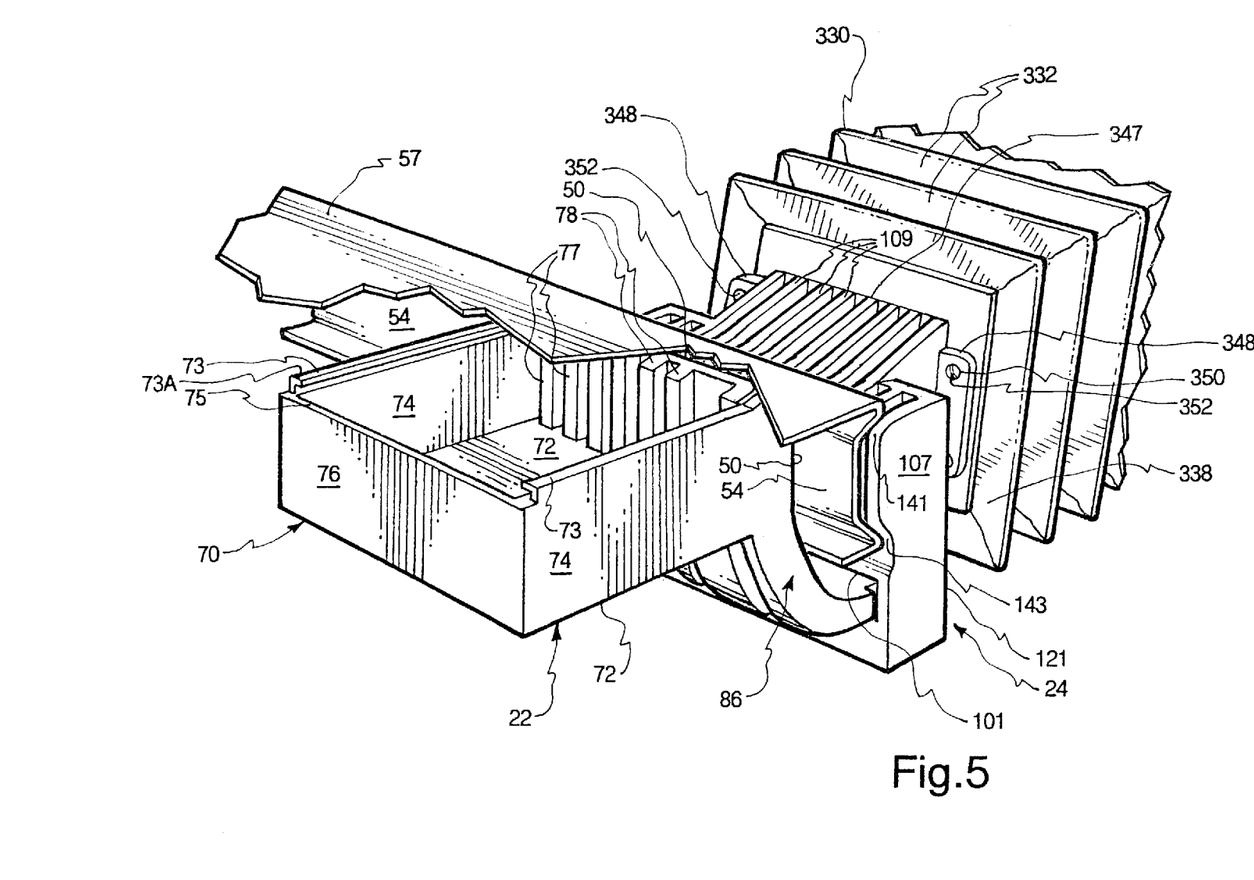
FIG. 5 is a reverse perspective of the proximal end of the display mechanism of FIG. 1, with the parts thereof assembled.
Figure 9:
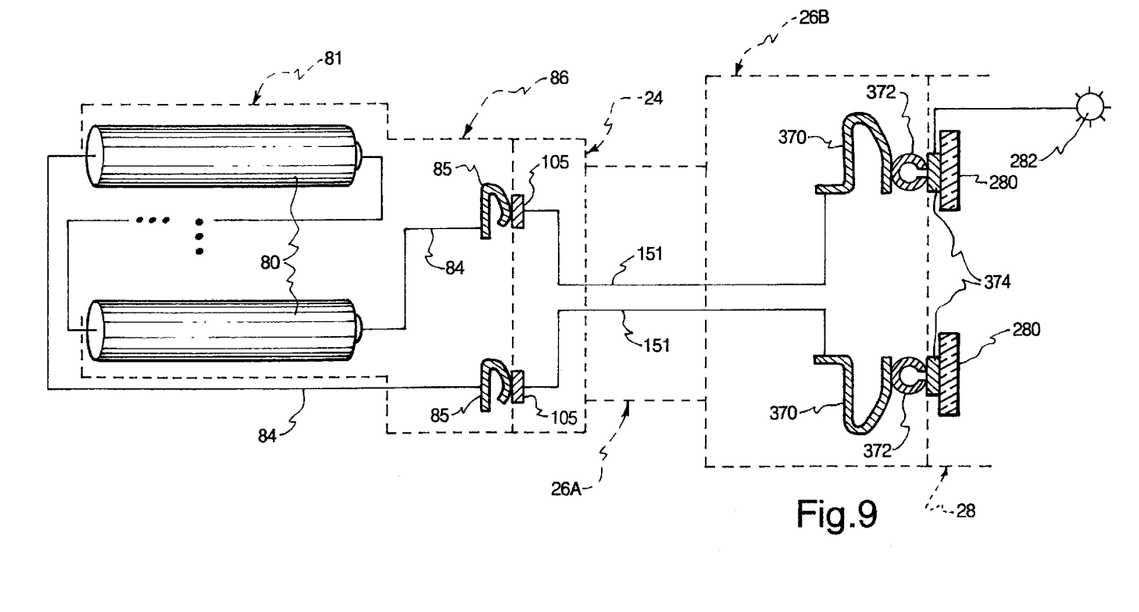
FIG. 9 is a circuit diagram.

The linear rectangular opening or slot 101 into recess 99 ends at edge or abutment surface 103 (FIG. 4). When the yoke 86 contiguously engages the surface 103, the electrical spring contacts 85 engage respectively a pair of electrical contacts 105 disposed within the recess 99 adjacent the edge surface 103, as best illustrated in FIG. 9. The recess 99 and slot 101 are located at the rear and toward the bottom of the mounting member 24.

Mounting member 24 comprises essentially a body of material 107 comprising weight-reducing, reinforcing ribs 109 to add strength and reduce weight. The mounting member 24 functions together with member 22 as a clamp to engage the molding strip 54, front and back, respectively, as shown in FIG. 6. Mounting member 24 also functions to receive mounting member 22, as described above. The hanger members 26A and 26B transfer the load of and impact forces upon the display 28 to the mounting member 24 and thence to the molding strip 54 and the shelf 57. More specifically, in reference to FIG. 7, the mounting member 24 comprises a pair of distally-extending spaced rectangular flat arms 111, each formed as one piece with the remainder of the member 24. Each arm 111 is apertured at 113, as is hanger member 26A, at 115 and 117. Each set of apertures 113, and 115 are aligned. Apertures 115 and 117 are diametrically the same size while apertures 113 are slightly larger. A shaft or pin 119 is securely press fit into each associated apertures 115 and 117 bu loosely passes through the associated aperture 113, to pivotally connect the mounting member 24, at arms 111, to the hanger member 26A. Thus, a limited amount of pivotal movement between surfaces 121 and 123 by the hanger member 26A in respect to the static mounting member 24 (when mounted to molding strip 54) is accommodated.

The mounting member 24 also comprises a forwardly extending boss 127 in which a vertically-directed bore 125 is disposed. A screw fastener 129 passes loosely through the bore 125 and threads into a threaded bore 131 of a sign angle adjustment member or wedge 133. A pin 126, in the nature of a set screw, passes through wedge 133 and extends slightly into bore 125 within an annular groove 128 in fastener 129. This arrangement allows screw 129 to turn without advancing or retracting in bore 125. Because flat surface 135 of member 24 contiguously engages flat surface 137 of the wedge 133, as the screw fastener 128 is rotated, it is not possible for the angle adjustment member 133 to rotate. Therefore, the angle adjustment member moves up and down surface as screw 129 is turned, depending upon the direction of rotation. When advanced, the curved surface 139 of the angle adjustment member 133 engages surface 141 of member 26A. Continued rotation will adjust the angle of the hanger members 26A and 26B and the display 32 in a counterclockwise direction when viewed from the position shown in FIG. 1. Opposite rotation of the screw 129 will result in clockwise rotation of the hanger members 26A and 26B and the display 32 in respect to the static mounting member 24, when the apparatus 20 is shelf mounted.

Mounting member 24, like most of the component of the assembly 20, is preferably formed of non-frangible, impact-resistant, durable synthetic resinous material, such as ABS, and may be formed by known methods of plastic molding, including but not limited to injection molding.

In reference to FIG. 6, it is to be noted that in the assembled, clamped condition, the surface 52 of member 24 engages the shelf 54 at pressure applying points 141 and 143. The yoke 86 is shown as engaging the molding strip 54 at compression-applying site 145.

As should be clear from the foregoing, when the assembly 20 is fully assembled and is clamped to the molding strip 54, the mounting member 22 is stationary, as is the mounting member 24. Proximal hanger member 26A accommodates, by displacement of fastener 129, as explained above, a limited amount of tilting, within a vertical plane, of hanger members 26A and 26B and the display 28 itself. However, once the tilt wedge 133 is positioned as desired by suitable rotation of fastener 129 to contiguously engage surface 141 and to set the desired tilt of the display distal of mounting member 24, no further rotation, in any plane, by hanger member 26A in respect to mounting member 24 occurs. In other words, at that point, members 22, 24 and 26A are disposed in static or stationary positions, except member 26A may rotate due to an impact force or the like in a vertical plane in a counterclockwise direction as viewed in FIG. 6 until surface 123 engages surface 121, provided those surfaces are not contiguous prior to imposition of the impact force.

As shown in FIG. 9, the electrical contacts 105 disposed adjacent edge wall 103 are connected respectively to conducting wires 151, for delivery of low voltage electrical power from batteries 80 to sources of illumination 282 carried by the display 28, as explained in greater detail below. Wires 151 pass from mounting member 24 through aperture 120. See FIG. 7.

The hanger member 26A may be formed of suitable synthetic resinous material, such as ABS, either as one piece or as a plurality of pieces which are adhered, bonded or welded to each other to form an integrated member 26A. The hanger member 26A comprises a central main body portion 140 which comprises top and bottom undulating surfaces 142 and 144, respectively. See FIG. 6. Top and bottom surfaces 142 and 144, respectively function as stops to limit the extent to which the hanger 26B may be pivoted or displaced up and down in a vertical plane.

The member 26A comprises arrow-shaped side flanges 146 and 148, respectively, which extend below and above surfaces 142 and 144, respectively, but otherwise comprise dimensions congruent with the side dimensions of the central body 140. Side flanges 146 and 148 serve as stops, limiting the extent to which the hanger member 26B can be pivoted laterally in either direction in respect to hanger member 26A, as shown in FIG. 3. Side flanges 146 and 148 also function as shields or guards to enhance the safety of the mechanism, for example, when the hanger member 26B is pivoted in respect to the hanger member 26A.

The central body 140 of member 26A comprises two spaced proximal slots 150 and 152 (FIG. 7) into which arms, anchors or ears 111 of member 24 fit. As explained above, the flat ears 111 are secured pivotable for limited movement by the member 26A by the tubes 115, one on each side, which passes loosely through the associated lug aperture 113 and tightly in adjacent apertures 115 and 117.

The central body portion 140 comprises an axial, large diameter, centrally-located throughbore 162 in which the return mechanism 36 is spacedly and centrally positioned in tension. Strap 46, inner spring 40 and outer spring 38 comprise the return mechanism 36 and are each secured at respective proximal looped ends thereof so as to span, in tension, between cross rods or pins 42 and 44.

As mentioned earlier, the distal surface of the central body 140, at interface 34, defines the pivotable relationships between the hanger member 26B and the hanger member 26B. Specifically, central body 140 comprises a flat vertical distal surface 166. See FIG. 3. Recessed in surface 166 are four semi-cylindrical indentations, i.e. a top, horizontally-disposed semi-cylindrical indentation 168, a bottom semi-cylindrical horizontally-directed semi-cylindrical recess 170, a first vertically-disposed semi-cylindrical recess 172 and a second vertically disposed semi-cylindrical recess 174. In short, top recess 168 accommodates pivoting of the hanger member 26B in an upward direction, recess 170 accommodates pivoting of the hanger member 26B in a downward direction, recess 172 accommodates lateral rotational displacement of the sign in one direction and recess 174 accommodates lateral rotational displacement of the hanger member 26B in the other lateral direction.

From the foregoing, it is clear that semi-cylindrical recesses 168, 170, 172 and 174 assist in defining four axes of rotation by which the hanger member 26B and the advertising frame 28 pivot up and down and laterally in either direction in respect to hanger member 26A.

Bore 162 is diametrally reduced in size at shoulder 163 to form a central proximal port 165, through which insulated conductors 151 pass. Wires 151 pass through bore 162 as well.

The hanger member 26B is illustrated in the Figures as being comprised of two identical or substantially identical opposite hand pieces which are, following conventional molding, glued, bonded or welded together along a vertical plane so as to form an integrated part. In the alternative, the hanger member 26B may be formed as a single piece through known injection molding techniques. On the other hand, if more convenient, hanger member 26B may be formed of more than two parts which are thereafter adhered into an integrated element of the display assembly 20. Any suitable synthetic resinous material may be used to form hanger member 26B, such as ABS plastic. Before explaining in detail the structural and functional makeup of the hanger member 26B, it should be emphasized that pivoting of the display assembly 20 is accommodated by rotational displacement of the hanger member 26B in respect to the hanger member 26A, at the interface 34.

On the other hand, the hanger member 26B serves to removably connect with the advertising-carrying frame 28 thereby allowing for replacement of the frame 28, with its advertising, by a similar or dissimilar advertising segment. The hanger member 26B comprises a central body 200, the proximal interior of which defines a frusto-conical recess or blind bore 202 aligned with bore 162, across which, toward the distal blind end 203 of the frusto-conical recess 202 spans rod 42. The opposite ends of the rod 42 extend into and are anchored in oppositely-located transversely-disposed blind bores 206 in the main body 200. See FIG. 7.

The distal eyelet ends of the strap 46, the coil spring 40 and the coil spring 38 loop around and are secured to the cross rod 42. The proximal eyelets of strap 46, and the coil springs 40 and 38 are secured to cross rod 44. Rod 44 is secured to member 26A at the ends thereof as well. The springs 40 and 38 are thus placed in tension between rods 42 and 44, thereby causing the hanger member 26B to compressively engage the member 26A at recesses 168, 170, 172 and 174.

Extending proximally from the main body 200 distally are top and bottom wedge-shaped stops 208 and 210, respectively. See FIG. 3. The under surface 209 of each wedge-shaped stop 208 and the upper surface 211 of each wedge-shaped stop 210 each have a curved configuration shown to be selected to match or substantially match the undulating configuration of top surface 142 and bottom surface 144, respectively, of the member 26A. When the distal portion 28 of the display assembly 20 is displaced at least in part in a vertical plane, for example by a shopper or a shopping cart in an upward direction, the member 26B is so displaced as well, the magnitude of upward displacement being limited by engagement between the bottom surfaces 209 of stops 208 and surface 142. This displacement is accommodated by a pivoting action by cylinders 216 at semi-cylindrical recess 168.

Similarly, when an external force displaces the distal part of the display assembly 20 in a downward direction, the member 26B is so displaced as well, the magnitude of such displacement being limited by contiguous engagement of the upper surfaces 211 of the stops 210 against surface 144.

Between the wedge-shaped stops 208 and 210 extend proximally. Adjacent vertical surface 212 cylindrically-shaped rotation-accommodating solid cylinders 214, 216, 218 and 220 are disposed, which are collectively arranged in a rectangular or square pattern. Cylinders 216 and 218 extend horizontally and are spaced from each other a predetermined distance to accommodate a nesting, contiguous relationship within semi-cylindrical recesses 168 and 170, respectively, of the member 26A. Similarly, vertically-directed solid cylinders 220 and 222 are spaced so as to nest within recesses 174 and 172, respectively. The cylinders 216, 218, 220 and 222 in conjunction with recess 168, 170, 172 and 174 accommodate upward displacement of the hanger 26B, downward displacement of the hanger member 26B, lateral deflection of the hanger member 26B in one direction and lateral displacement of the hanger member 26B in the other direction, or a combination thereof. Thus, the member 26A pivotably interfaces uniquely and compressively with the hanger member 26B to enhance the deflectable nature of the cantilevered part such that the weight and external loads imposed upon the return mechanism are greatly reduced, thereby enhancing the life of the return mechanism. The return mechanism 36 accommodates up, down and bi-lateral displacement responsive to an external force and returns the pivoted distal part of the display assembly to the neutral position when the external force is removed.

Thus, the center line of the cylinders 216, 218, 220 and 222 comprise separate axes of rotation for the four forms of displacement mentioned above. As shown in FIG. 3, the hanger member 26B is illustrated as having been rotated through essentially 90 degrees about the axis of the cylinder 220, the cylinder 220 remaining nested in the semi-cylindrical recess 174 to accommodate such rotation. The main body 200 of hanger member 26B comprises opposed essentially vertically-extending side flanges 224 and 226. Flanges 224 and 226 respectively function as stops by engagement with the exterior surface of flanges 146 and 148 to limit lateral pivotal displacement in either direction to essentially 90 degrees. In the neutral orthogonal position, the flanges 224 and 226 each extend parallel to the shopping aisle. The flanges 224 and 226 are apertured at 356 to secure a boot, which covers and conceals members 26A and 26B, as explained in greater detail below.

The body 200 of the hanger member 26B comprises a bifurcated configuration comprising top and bottom flanges 230 and 232 by which the frame 28 is removably or releasibly connected, using countersunk screw fasteners 58. The distal end of the hanger member 26B comprises reinforcing regions 234 and 236, respectively.

Each countersunk screw 58 passes through an aperture 239 in associated flange 230 or 232, as the case may be, and threads into a threaded blind bore 241 in the proximal edge of the display 28. The upper and lower flanges 230 and 232 centrally merge into the central body 200, which, among other things, projects distally so the distal face 242 matches the proximal configuration of the frame 28 in a contiguous load-transferring manner. Thus, a substantial portion of the weight of the frame 28 and the advertising carried by the frame 28 is transferred across face 242, as are impact loads.

Figure 2:
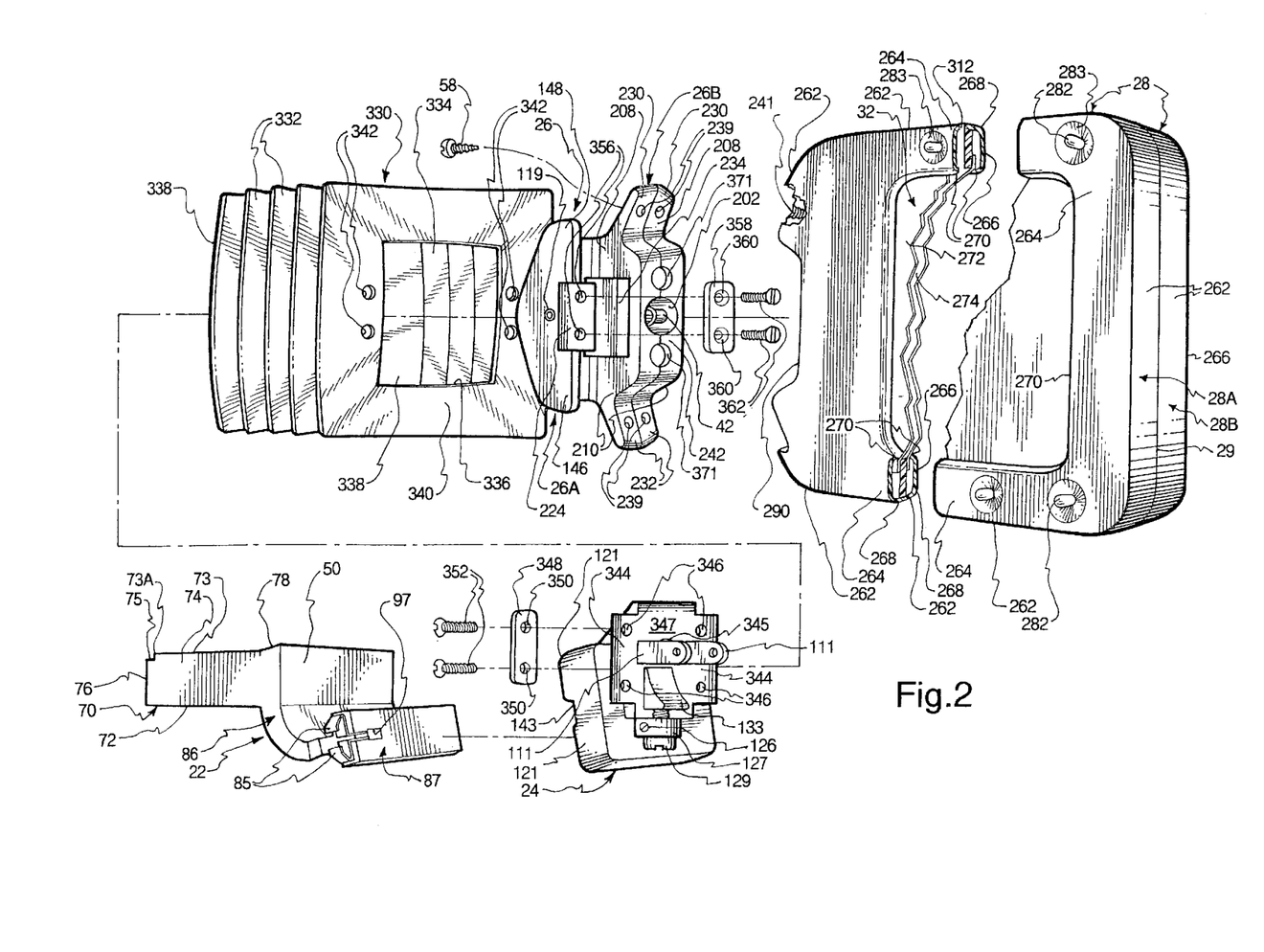
FIG. 2 is an exploded perspective of the display assembly of FIG. 1.
Figures 7, 8:
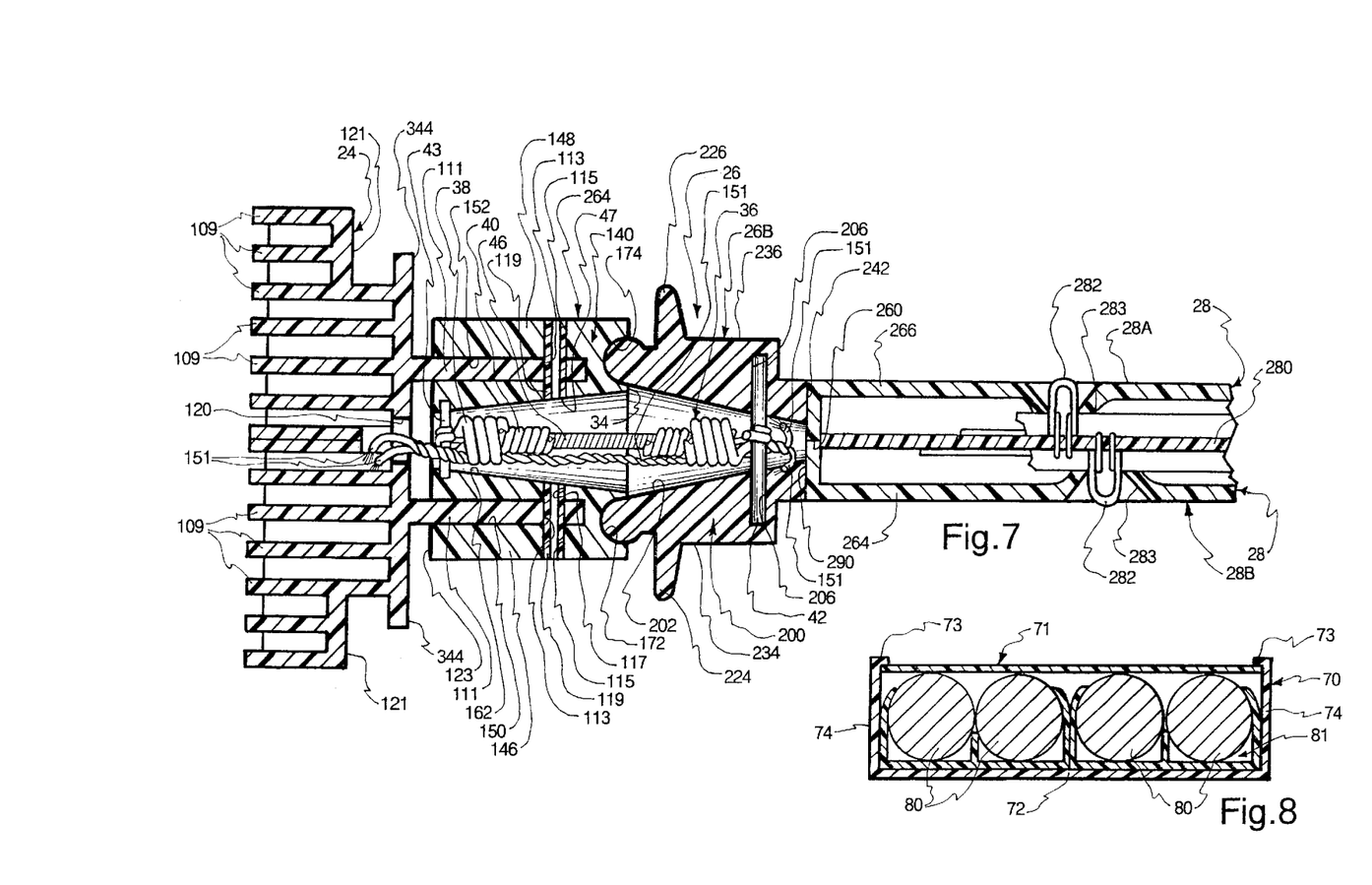
FIG. 7 is a horizontal cross section through the proximal portion of the display assembly of FIG. 1.
FIG. 8 is a vertical cross section through the under-the-shelf battery housing, showing batteries therein.

As best seen in FIGS. 1, 2 and 7, the frame 28 is comprised of similar but opposite hand halves 28A and 28B, which are held together by a suitable bonding agent 29, to form a central juncture in a vertical plane, comprising contiguous inside edges 260. In addition to or in lieu of adhering the edges 260 of the two frame parts together, screws or other fasteners may be relied upon for fastening frame pats 28A and 28B together. When assembled, the top, bottom and distal peripheral portions of the frame 28 have substantially identical cross sections, except for countersunk apertures 283 through which lights 282 extend and a top slot, as hereinafter more fully explained. The cross section of the completed frame is illustrated in FIG. 7. Accordingly, when joined together, the frame comprises a peripheral wall 262, two spaced side walls 264 and 266, which respectively connect to inwardly directed short flanges 268 and 270, which define a gap therebetween. This gap comprises a top slot 312 accessing to the space between opposed transparent shields 272 and 274 accommodating insertion and removal of a two-sided advertising sheet or card between the transparent planar shields 272 and 274. Two one-sided advertising cards, back-to-back, may be used. Shields 272 and 274 may be of glass or polycarbonate transparent material.

A U-shaped circuit board 280 (FIG. 7) with lights 282 mounted thereon, each in a countersunk aperture 283, is positioned in the hollow interior between walls 264 and 266 so as to extend within the frame 28 along the top, the bottom and the distal region of the frame.

The circuit board 280 is illustrated as comprising a plurality of lights 282 which preferably comprise light-emitting diodes (LEDs). Other sources of illumination may be used. However, as few as one light or source of illumination may be used. Each light or LED 282 extends through an aligned countersunk aperture 283 in the frame 28. The frame 28 may be formed of any suitable material such as ABS synthetic resinous material. It is to be appreciated that the circuit board 280 comprises conductors which appropriately supply electrical power obtained from batteries 80 along the circuit board to each of the lights 282.

The proximal end of the frame 28, in its assembled and united form, comprises a circuitous wall 290, which merges with the top and bottom peripheral frame portions 262, is illustrated as being of uniform thickness and conforms to the shape of the distal edge of the hanger member 26B so that the two mate contiguously at seam 29 when in the assembled condition. See FIG. 1. Wall 290, near the top and bottom, respectively, comprises sets of threaded bores 241, each of which threadedly receives a threaded end of one of the screws 58 (FIGS. 2 and 3) to removably attach the frame 28 to the hanger member 26B.

Planar advertising copy in the form of a rectangular card with advertising information or indicia on both sides may be inserted between the transparent plastic windows 272 and 274through the top slot 312 at seam 29. Two advertising cards, with oppositely directed advertising information, may be likewise inserted.

Because the return mechanism 36 comprises spring coils 38 and 40 and because the hanger member 26B pivots into an open relationship in respect to the hanger member 26A, in some configurations of the present invention, an elastomeric protective boot may be placed in surrounding location over the portions of the assembly which open during pivoting, to prevent injury to a child or a shopper and to prevent entry of dirt or other debris. A suitable boot 330 for this purpose is illustrated in FIGS. 1, 2, 4 and 5. While the boot 330 is illustrated as being in bellows or pleated form, other configurations may be used. The boot 330 may be adhered at its ends to appropriate locations around the periphery of the members 26A and 26B. The boot 330 may, alternatively, be stretched into its protective position. No matter how installed, the boot 330 shields the portions of the display assembly 20 which create openings when the distal pivotable portion of the assembly is pivoted in respect to the proximal non-pivoting portion of the assembly.

The boot 330, in the illustrated configuration, is formed of a suitable elastomeric material and sized so that it can be stretched and pulled into position over members 26A and 26B, after assembly. Boot 330 comprises fellows 3332, a hollow interior 334 and proximal and distal openings 336. The boot 330 comprises proximal and distal end bellows flanges 338 and 340 in which openings 336 are located. Flange 338 and 340 are apertured at 342.

Member 24 comprises side flanges 344 in which pairs of threaded apertures 346 are disposed. See FIG. 2. The proximal end flange 338 of the boot 330 is positioned contiguous with flanges 344 so that the pairs of apertures 340 and 342 in flange 338 are respectively aligned with apertures 346. A pair of flat metal or plastic bars 348 are placed contiguous with the flange 338 so that apertures 350 are aligned with the aligned aperture 346, 340 and 342. Screws 352 are threaded through the aligned apertures to thereby releasibly fasten the proximal end of the boot 330 to the assembly 20.

Similarly, the hanger member 26B comprises integral opposed side flanges 224 and 226, each comprising a pair of threaded apertures 346. The bellows distal flange 340 is placed distally contiguous with flanges 224 and 226 so that the pairs of apertures 356 are aligned with the pairs of apertures 342. Two flat steel or plastic bars 358, each having a pair of apertures 360 therein, are placed distally and contiguously over bellows flange 340 adjacent to the flanges 350 so that three pairs of apertures 342, 356 and 360, on each side are aligned. Screws 362 are inserted through each group of aligned apertures and threaded into threaded apertures 356. In this way, the distal end of the boot 330 is releasibly fastened to the assembly 20.

Reference is now made to FIG. 9, comprising a circuit diagram. As mentioned, the batteries 80 are electrically connected in series within the carrier 81. Conductors 84 in turn electrically connect through yoke 86 to conductor clips contacts 85 carried at one end of slider bar 87, which, in the assembled condition, are contiguous with conductor contacts 105, carried by mounting member 24. Elements 105 are in electrical communication with wires or conductors 151, which electrically communicate with conductive spring contacts 370. Wire 151 passes through hanger members 26A and 26B, while contacts 370 are carried by hanger member 26B. Contacts 370 contiguously electrically communicate with conductive elements 372 within member 26B, which in turn are in contiguous electrical communication with conductive strips 374, carried by circuit board 280. The conductors 374 are in electrical communication with the LED or sources of illumination 282. The illumination of the lights 282 may be continuous or, using conventional technology, illumination of the lights 282 may be sequential, flashing or comprise any other pattern.

Figure 10:
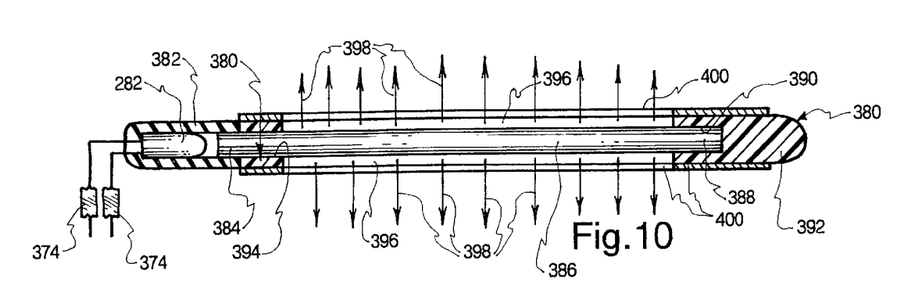
FIG. 10 is a cross section of a display assembly comprising a novel elongated source of illumination.

Reference is now made to FIG. 10 which illustrates a novel elongated source of illumination carried in a display frame 380 of a display assembly of the type described above. Electrical power is delivered from the circuit of FIG. 9 or other suitable circuitry to metal ribbons 374 on a printed circuit board, which electrical power in turn is delivered to an LED 282. Accordingly, LED 282 is illuminated either continuously or periodically as desired. The LED 282 is illustrated as being surrounded by an annular shroud 382, which has an axial or longitudinal length substantially greater than the longitudinal length of the LED 282 so as to also concentrically and compressively engage one end 384 of a light-transmitting rod 386. Light-transmitting rod 386 preferably is formed of a suitable synthetic resinous material, such as acrylic. The other end 388 of the light-transmitting rod 386 is snugly anchored in blind bore 390 at the distal end 392 of the the light-transmitting rod 386 is snugly anchored in blind bore 390 at the distal end 392 of the display 380. End 384 of the rod 386 also is snugly held in throughbore 394 of the display frame 380.

The display frame 380 is illustrated as being formed of synthetic resinous material so as to comprise opposed open horizontally disposed slots 396, which slots 396 are long in a proximal to distal direction but narrow in a vertical direction. Light from LED 282 passing along light-transmitting rod 386 is emitted in opposite directions through opposed slots 396 to attract customer attention, as illustrated by arrows 398. Of course, a single slot could be used, particularly where two spaced light-emitting rods comprise the display assembly are also used whereby light would be emitted, preferably, in both directions, in one direction through one slot from one light-transmitting rod and in the opposite direction through a second slot from a second light-transmitting rod.

The frame 380 is illustrated in FIG. 10 as comprising opposed layers 400, one on each side, each layer 400 exhibiting product advertising information or indicia.

The invention may be embodied in other specific forms without departing from the spirit of the essential characteristics thereof. The present embodiments, therefore, are to be considered in all respects as illustrative and are not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A point-of-purchase cantilevered display assembly comprising:
   an attachable/detachable/exchangeable advertising distal display portion comprising electrical lighting system;
   a distal hanger member which is pivotable and to which the advertising display portion at a proximal end thereof is selectively attached and detached;
   a proximal hanger member contiguous with a distal hanger member and in respect to which the distal hanger member is pivotable;
   a first mounting member contiguous with the proximal hanger member which contiguously and compressively engages a front side of a molding strip;
   a second mounting member connected to the first mounting member which contiguously and compressively engages a back side o the molding strip;
   a return mechanism extending between the hanger members accommodating displacement of the display portion and the distal hanger member between pivoted and non-pivoted positions.

2. A point-of-purchase cantilevered display assembly according to claim 1 wherein the second mounting member is disposed under a shelf behind the molding strip.

3. A point-of-purchase cantilevered display assembly according to claim 2 wherein the second mounting member comprises a housing compartment in which at least one battery is disposed and further comprising electrical conductors disposed between the battery and a source of illumination carried by the display portion.

4. A cantilevered display assembly comprising:
   a distal sign comprising at least one source of illumination;
   a proximal mounting portion which holds the distal sign in cantilevered relation, the proximal mounting portions comprising a connector clamp for cantilever mounting the assembly to a molding strip of a shelf;
   a self-contained source of electrical power disposed behind the molding strip beneath the shelf, the source of electrical power being electrically connected to the source of illumination across the proximal mounting portion;
   the connector clamp comprising a first clamp portion thereof disposed behind the molding strip below the shelf and a second clamp portion disposed in front of the molding strip of the shelf;
   at least one screw carried by the first damn portion of the proximal mounting portion which releasibly engages the back side of the molding strip.

5. A cantilevered display assembly comprising:
   a distal sign comprising at least one source of illumination;
   a proximal mounting portion which holds the distal sign in cantilevered relation, the proximal mounting portions comprising a connector clamp for cantilever mounting the assembly to a molding strip of a shelf;
   a self-contained source of electrical power disposed behind the molding strip beneath the shelf, the source of electrical power being electrically connected to the source of illumination across the proximal mounting portion;
   the connector clamp comprises a first clamp portion thereof disposed behind the molding strip below the shelf and a second clamp portion disposed in front of the molding strip of the shelf;
   the first clamp portion and the second clamp portion being releasibly connected.

6. A cantilevered display assembly according to claim 5 wherein the releasible connection between the first clamp portion and second clamp portion comprises a male/female connection.

7. A cantilevered display assembly according to claim 6 wherein the male/female connection comprises a tongue and groove connection.

8. A method of advertising via a display assembly for point-of-purchase merchandising in a store, comprising the steps of:

- releasibly securing a clamping portion of the display assembly to a molding associated with a shelf upon which goods being offered for sale in the store are placed;
- attaching a proximal part of a first hanger member in cantilevered relation to a distal part of the clamping portion;
- pivotably interfacing a second hanger member in cantilevered relation to a distal part of the first hanger member;
- connecting a peripheral frame portion carrying advertising and a source of illumination, in cantilevered relation to a distal part of the second hanger member;
- providing a source of electrical power behind the molding and below the shelf;
- electrically connecting the source of electrical power to the source of illumination.

\* \* \* \* \*